Dec. 22, 1970

W. MUELLER 3,548,671

CONTROLLABLE STEPWISE DRIVE OR TRANSMISSION

Filed May 9, 1969

INVENTOR
WERNER MUELLER

BY *Jacobi, Davidson & Kleeman*

ATTORNEYS

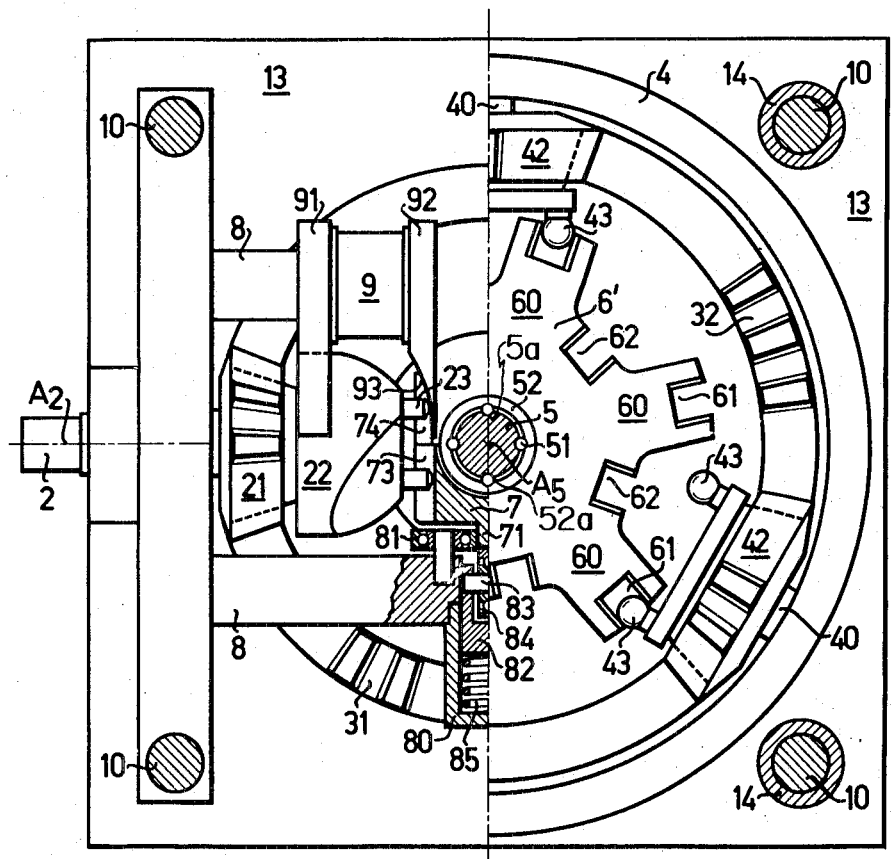

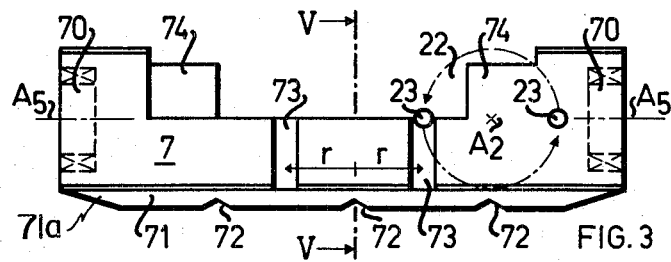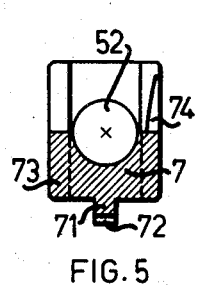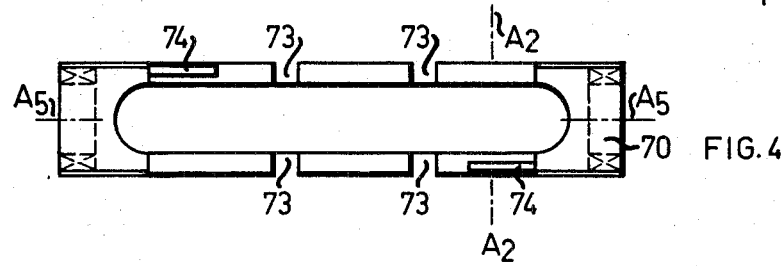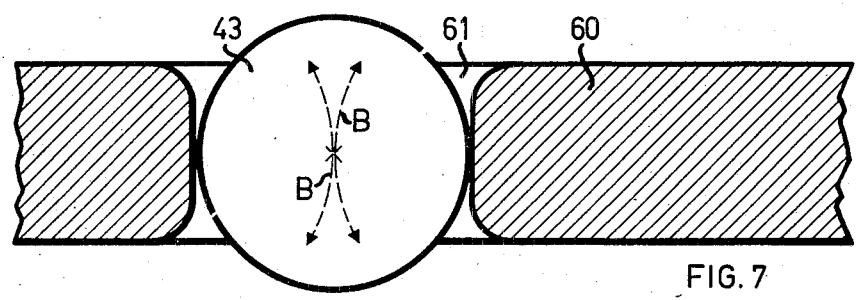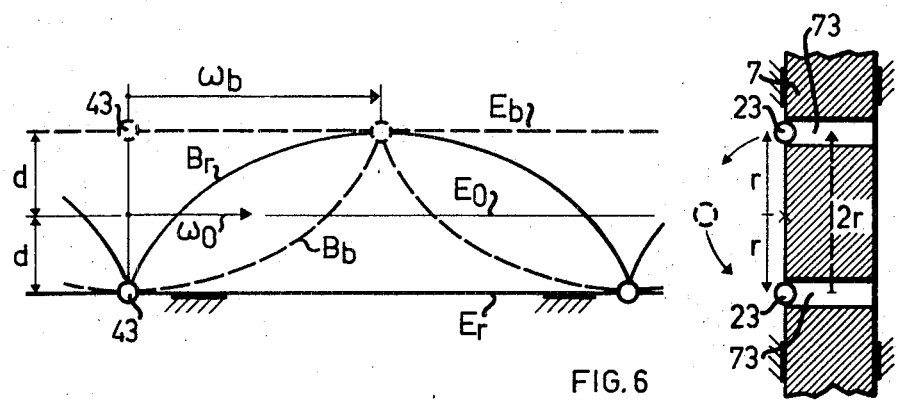

000000# United States Patent Office 3,548,671
Patented Dec. 22, 1970

3,548,671
CONTROLLABLE STEPWISE DRIVE OR TRANSMISSION
Werner Mueller, Aarau, Switzerland, assignor to Contraves AG, Zurich, Switzerland, a corporation of Switzerland
Filed May 9, 1969, Ser. No. 823,355
Claims priority, application Switzerland, May 10, 1968, 7,032/68
Int. Cl. F16h 35/02
U.S. Cl. 74—394      10 Claims

ABSTRACT OF THE DISCLOSURE

A controllable stepwise drive arrangement for deriving rotational steps and rotational step sequences for an output shaft from a motor driven input shaft as a function of control signals. The inventive drive arrangement comprises planetary gearing means incorporating rotatably mounted sun gear means arranged behind one another at a common axis, one of said sun gear means being coupled with said driven input shaft and the others possessing stepwise therefrom different rotational speeds. A respective planetary gear revolving about the axis of said sun gear means meshing with two sun gear means of neighboring rotational speed stages, said planetary gear carrying at one end face at least one entrainment means carrying out epicycloidal movements with respect to the planes of said sun gear means. A power take-off wheel having recesses is mounted coaxially for rotation with respect to said sun gear means and is coupled with said output shaft, said entrainment means cooperating with said recesses of said power take-off wheel. A signal-controlled harmonic auxiliary drive arrangement cooperates with said power take-off wheel, said power take-off wheel being displaceable as a function of the input shaft in the direction of the axis of said sun gear means from discrete positions in which it is coupled with a respective sun gear means into a neighboring position, whereas during such displacements it remains coupled with at least one respective entrainment means of a planetary gear and under the action thereof is continuously accelerated and decelerated, respectively, from the rotational speed of one sun gear means to the rotational speed of the next sun gear means.

BACKGROUND OF THE INVENTION

The present invention relates to an improved controllable stepwise drive or transmission arrangement for deriving uniform rotational steps or increments and for the uninterrupted sequence of such unitary rotational steps of an output shaft from a continuously driven input shaft as a function of control signals.

Such type stepwise drive or transmission arrangements, which in themselves are known to the art, are advantageously used for the digital displacement of machine components, or, for instance, writing instruments or pens at coordinate graphs, in place of controlled stepping motors. Known stepwise drive arrangements for the previously mentioned purpose can consist of a Maltese-cross drive arrangement, the continuously driven driving disc of which supports drive pins or shafts which can be electromagnetically advanced or retracted for controllable engagement with a cross-slotted disc member. In this type of controllable stepwise drive arrangement, each individual rotational step consists of an acceleration period from standstill and a deceleration period back to standstill, so that each sequence of rotational steps is interrupted by a standstill period, even if it is momentary. However, this type of motion is undesirable.

According to a proposed solution of the assignee of this application, it is possible to prevent this drawback. More precisely, such solution contemplates that, as a function of the rotation of the input shaft, continuously axially to-and-fro moving switching pin members, which are electromagnetically advanced and retracted for engaging with predetermined different types of guide curves or surfaces of switching gears or wheels seated upon the output shaft, are controlled in such a manner that each movement period consists of an acceleration half-step from standstill, an optionally selectable number of uniform whole steps and a deceleration half-step back to standstill. This known physical construction of controllable stepwise drive arrangement of the previously mentioned type, however, exhibits the drawback that for each rotational step, that is to say, also for an uninterrupted sequence of uniform whole steps, at least one of the switching pin members, which is moved to-and-fro and electromagnetically advanced or retracted, must be controlled for the performance of a step.

SUMMARY OF THE INVENTION

Accordingly, it is a primary objective of the present invention to provide an improved stepwise drive arrangement or transmission of the previously mentioned type which effectively overcomes the aforementioned drawbacks of the heretofore mentioned constructions.

Another, more specific object of the present invention relates to an improved controllable stepwise drive arrangement which is relatively simple in construction, economical to manufacture, extremely reliable in operation, requires a minimum of servicing and is not readily subject to breakdown.

Yet a further, more specific, but extremely significant object of the present invention is to provide a stepwise drive arrangement which is considerably simpler in its physical construction or operation from the prior art structures, and furthermore, wherein only the acceleration step and the deceleration step of the output shaft must be triggered by appropriately controlled entrainment devices, whereas the output shaft for the uniform motion phases or periods are simply positively and form-lockingly coupled with the continuously driven input shaft and for the standstill phases or periods are positively and form-lockingly coupled with a stationary transmission component.

Now, in order to implement these and still further objects of the invention which will become more readily apparent as the description proceeds, the inventive stepwise drive or transmission arrangement is generally manifested by the features that a rotatable sun gear of a planetary gearing arrangement is coupled for continuous rotation with an input shaft. The rim of teeth of the driven sun gear is situated coaxially opposite the toothed rim of a stationary sun gear. Furthermore, the toothed rim of at least one planetary gear which revolves about the common axis of both sun gears meshes with the toothed rims of both sun gears. This planetary gear carries at its inner end face at least one inwardly protruding entrainment head member arranged eccentrically with respect to its axis of rotation and revolving about the axis of the sun gear. This entrainment head member carries out epicycloidal movements relative to both sun gears. Additionally, a star wheel is mounted to be axially displaceable between both of the sun gears. This star wheel is coaxial with respect to such sun gears and is coupled with the output shaft for transmission of the rotational movement. Such star wheel can be displaced to-and-fro from a first terminal position in which it is positively and form-lockingly coupled with one of the sun gears into a second terminal position in which it is positively and form-lockingly coupled with the other sun gear. Additionally, there is provided a signal-controlled auxiliary transmission or drive for initiating such axial displacements of the star wheel from the one terminal position into the other terminal position. This auxiliary drive or transmission derives the mentioned axial displacements of the star wheel from the continuous rotation of the driven sun gear as harmonic sinusoidal or conical functions in such a way that during axial displacement of the star wheel, an entrainment head member of at least one planetary gear continuously remains in engagement with a recess of the star wheel and thus, the star wheel as well as the output shaft coupled therewith is continuously accelerated and decelerated, from the rotational speed of the one sun gear to the rotational speed of the other sun gear.

BRIEF DESCRIPTION OF THE DRAWINGS

The invention will be better understood, and objects other than those set forth above, will become apparent, when consideration is given to the following detailed description thereof. Such description makes reference to the annexed drawings wherein:

FIG. 2 is a cross-sectional view, partially viewed from the front, essentially taken along the line II—II of FIG. 1;

FIG. 3 is a side view of the slide or slider body member;

FIG. 4 is a top plan view of the slider body member;

FIG. 5 is a cross-sectional view through the slider body member depicted in FIG. 3, taken substantially along the line V—V thereof;

FIG. 6 is a schematic motion diagram for the movement of the entrainment head members and the slider drive mechanism;

FIG. 7 is a fragmentary view illustrating the cooperation of an entrainment head member with the recesses in the star wheel; and FIG. 8 graphically illustrates a possible motion diagram or curve for the output shaft member.

DESCRIPTION OF THE PREFERRED EMBODIMENTS

Figure 1:
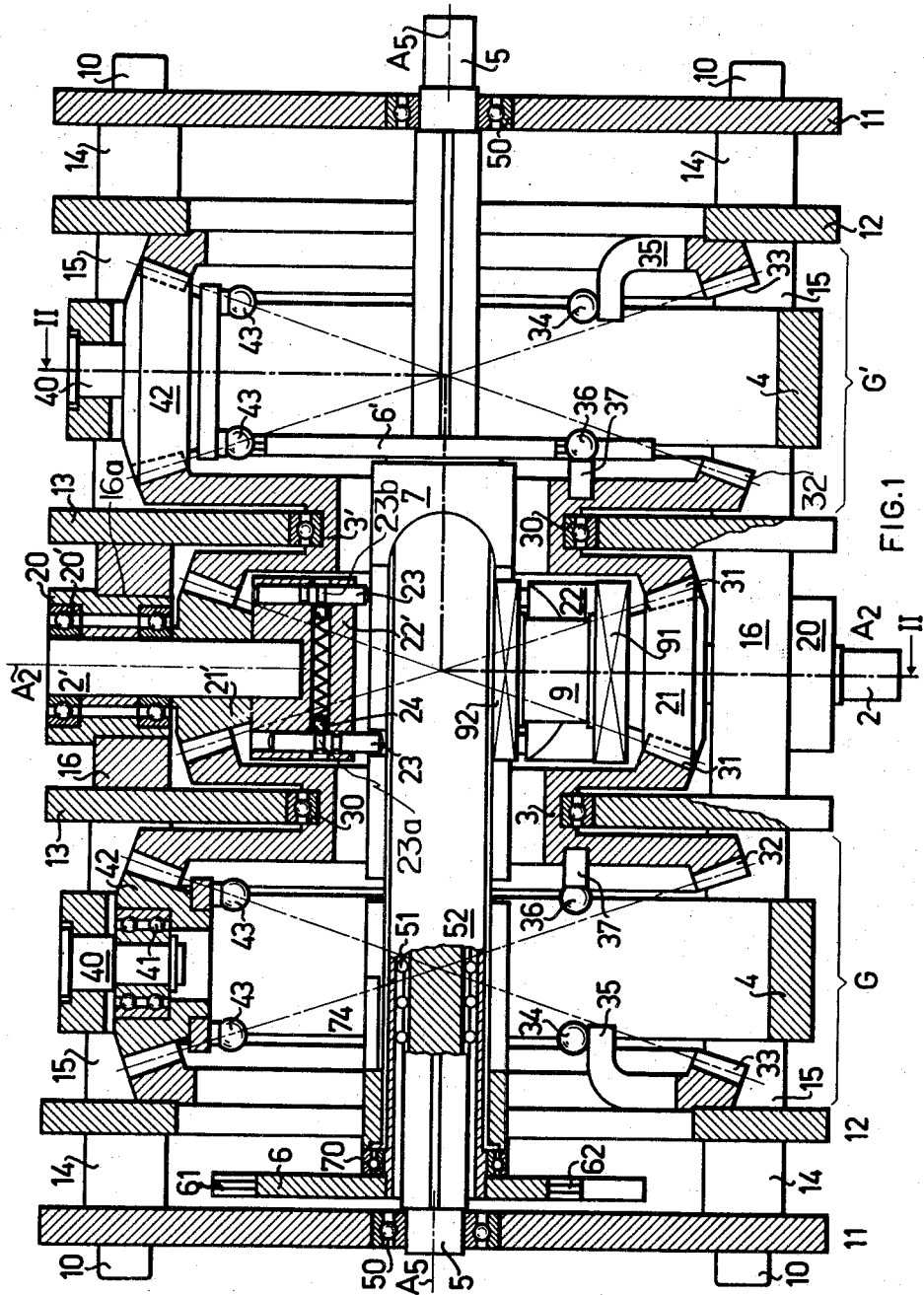
FIG. 1 is a longitudinal sectional view taken through the horizontal sectional plane of a preferred embodiment of controllable stepwise drive arrangement.

Describing now the drawings, the exemplary embodiment of stepwise drive mechanism or arrangement depicted in FIGS. 1 and 2 embodies an appropriate support construction for the movable components. In the arrangement shown, such support construction basically consists of plate slabs or side plates. More precisely, it will be recognized to encompass three pairs of side plates 11, 12 and 13 which, through the agency of spacer sleeves 14 and 15 and the plates 16 and four tension screw anchoring devices 10, are mutually rigidly interconnected with one another. The thus formed support construction contains two main axes $A_2$ and $A_5$ intersecting at right angles to one another and collectively defining the plane of the drawing of FIG. 1. The input shaft member 2 of the stepwise drive arrangement is mounted at the axis $A_2$. It is continuously driven by any suitable non-illustrated prime mover or drive motor, which for convenience has been omitted from the drawings. Along the same axis $A_2$, there is situated opposite the input shaft member 2 a second shaft member 2′. Bearing blocks 20 supporting roller bearings 20′ serve as the bearing means for both of these shaft members 2 and 2′. The bearing blocks 20, in turn, are mounted in suitable openings or recesses 16a provided at the plate members 16.

Shaft members 2 and 2′ rigidly support for rotation a respective pinion 21 and 21′ provided with bevel or cone teeth. These bevel teeth of the pinions 21 and 21′ mesh with respective appropriately formed bevel teeth 31 of two double-gears 3 and 3′, respectively, the hubs of which are rotatably mounted in the plates 13 by means of ball bearings 30. The roll-off cone of the bevel pinions 21 and 21′, upon the associated gear rims 31 of the double-gears 3 and 3′, respectively, are shown in FIG. 1 by dash-dot lines. Both of the double-gears 3 and 3′ are therefore oppositely driven by the continuously driven input shaft 2 through the agency of the bevel pinion 21 and, in turn, via the bevel pinion 21′ drive the shaft member 2′ opposite to the input shaft 2, but with the same rotational velocity or speed. The bevel teeth 32 of the double-gears 3 and 3′ respectively, which revolve in opposite directions about the axis $A_5$, each form a rotatable sun gear or wheel of a planetary gearing G and G′, respectively, which are mounted between the associated pairs of plate members 12 and 13, as best shown by referring to FIG. 1. Situated opposite each such driven sun gear 32, is a respective stationary sun gear 35 having a similar but mirror-image bevel teeth arrangement 33. These stationary bevel gear rims 33 are rigidly connected with their associated plate member 12, as shown.

Mounted in a respective ring member 4 which is coaxial to both of the pairs of sun wheel-gear rims 32, 33 are radial support shaft journals 40 having ball bearings 41 for planetary bevel pinions 42. In the illustrated embodiment there are provided for each of the planetary gearing arrangements G and G′ three planetary pinions 42 which are uniformly distributed about the periphery of the associated ring member 4, and both of the ring members 4 are only centered and supported by the meshing of the bevel teeth of the planetary pinions 42 with the sun gear bevel teeth 32, 33. Also, the development or roll-off cone surface of the planetary pinions 42 is shown in dash-dot lines in FIG. 1. The planetary pinions 42, which roll upon the gear rims 32 continuously rotating about the axis $A_5$ and upon the stationary gear rims 33, therefore carry out with the associated supporting ring member 4 a planetary revolving motion about the axis $A_5$, the rotational speed of which is half as great as the rotational speed imparted to the associated moving sun wheel-gear rim 32.

The output shaft 5 of the stepwise drive arrangement is freely rotatably mounted at the lengthwise axis $A_5$ with the aid of ball bearings 50 inserted at the outer plate members 11. As best seen by referring to FIG. 2, the output shaft member 5 is provided at its outer surface with a number of axially parallel grooves 5a for receiving ball members 51, these ball members 51 also engaging with axially parallel internal grooves 52a provided at a hollow shaft member 52 extending coaxially with respect to the shaft member 5. In this manner, the hollow shaft member 52 can be axially displaced relative to the output shaft member 5, but is rigidly connected for rotation therewith. At both ends of the hollow shaft member 52 there is rigidly connected a respective star wheel 6 and 6′ in such a manner that each such star wheel 6 and 6′ transmits any rotational movement or changes in rotational movement imparted to it, to the output shaft 5 via the hollow shaft 52 and the axial ball guide arrangement 51. Hollow shaft member 52 is, in turn, rotatably mounted with the aid of ball bearings 70 in a slide or slider body member 7, the ball bearings 70 preventing any relative movement between the hollow shaft member 52 and the slide body member 7 in the direction of the axis $A_5$.

It will also be understood that the slide body member 7 is hindered from carrying out rotational movement about the axis $A_5$ inasmuch as a linear guide rib member 71 provided at its underside is guided between the rollers 81. As best seen by referring to FIG. 2, rollers 81 are mounted upon supports 8 fixedly supported at the plate members 16. Supports 8 also carry a cylindrical tubular extension or cylinder 80 in which there is displaceably mounted a cylindrical piston body member 82. Piston body member 82 carries a transverse shaft 83 upon which is freely mounted for rotation a locking or engaging roller 84. Due to the force of a pre-biased spring 85, the engaging or arresting roller 84 is continuously pressed against the cam surface 71a of the rib member 71 disposed at the underside of the slide or slider body member 7. This cam surface 71a of the rib member 71, as best seen by referring to FIGS. 3 and 5, is equipped with three detents or notches 72 which, in cooperation with the engaging or locking roller 84, define three possible engaged positions for the slide body member 7.

At its central region the flank height of the slide body member 7 extends exactly to the height of the common plane of the axes $A_2$ and $A_5$. As also best observed by referring to FIG. 3, the flank walls are provided at their outside with perpendicular or vertical extending grooves 73 which are disposed between neighboring detents or recesses 72 of the rib member 71. Further, at each end of the slide body member 7 there is provided a respective deflector or diverter wedge 74, the function of which will be described in greater detail hereinafter.

In order to displace the slide body member 7 to-and-fro into a different one of its three possible positions determined by the locking grooves or detents 72, there is advantageously provided an elongate and electromagnetically controlled Maltese drive arrangement. Rigidly seated for rotation upon the input shaft member 2 and adjacent the bevel pinion 21 is a rotor 22. Likewise, a rotor 22' is rigidly seated for rotation upon the shaft journal 2' adjacent the pinion 21'. At these rotors 22 and 22', which rotate opposite to one another about the axis $A_2$, there are provided displaceable entrainment bolts or pin members 23 which can be displaced in appropriate bores, each in the direction of the rotor axis $A_2$.

The radial distance of the entrainment bolt members 23 from the axis $A_2$ is designated by the value $r$. These entrainment pin or bolt members 23 can assume a respective advanced or engaged position and a respective retracted or disengaged position, defined by the cooperation of the spring-loaded locking balls 24 with one of two respective peripheral grooves 23a and 23b provided at each of the entrainment bolt members 23. In their extended position, the entrainment bolt members 23 engage with a previously positioned groove 73 of the slide body member 7, whereas in their retracted position they will not do so, rather will merely rotate past the corresponding outer wall surface of the slider body member 7.

The entrainment pin or bolt members 23 are normally retracted and ineffectual. Serving to extend or advance the entrainment bolt members 23 is a given one of two electromagnetic displace mechanisms operably associated with the rotors 22 and 22'. These displacement mechanisms each encompass an excitation coil 9, the ferromagnetic core or armature of which is secured to one of the stationary supports 8. The core carries at both of its ends a respective ferromagnetic pole shoe 91 and 92. The pole shoe 91 is equipped with a cylindrical recess which extends coaxially with respect to the rotor 22 or 22', respectively, the boundary surface of which is situated opposite the outer surface of the associated rotor 22 or 22' such as to provide a very small air gap. The pole shoe 92 forms at its inside a cylindrically configured guide surface 93 (FIG. 2).

The rotors 22 and 22' and the entrainment bolt members 23 displaceably mounted therein likewise consist of ferromagnetic material. If the relevant magnetic coil 9 does not conduct any current and, accordingly, there is no magnetic flux induced in the associated magnetic circuit 9–91–22–23–92–9, then, all of the entrainment bolt members 23 remain in their retracted ineffectual position. Each previously extended entrainment bolt member 23 which is rotated from below against the guide surface 93 of the pole shoe 92 is displaced back or retracted into the relevant rotor 22 under the action of this guide surface 93. If one of the bolt members 23 should become effectual, that is, should be advanced or extended into its operable position, then the excitation coil 9 associated with its rotor 22 or 22' must be electrically connected in current conducting relationship with a suitable direct-current supply circuit when the relevant entrainment bolt member 23, during its revolving path of travel about the axis $A_2$, is rotated towards its upper reversing position. If this has happened, then during the next subsequent downward rotation it will remain adhering in its extended position at the associated guide surface 93 of the pole shoe 92. If it should occur that current is erroneously conducted to one of the magnetic coils 9 and an entrainment bolt member remains in its extended position adhering to the guide surface 93, although thereafter no groove 73 is in its preparatory position for receiving such extended or advanced entrainment bolt member, then the latter will be prevented from being extended due to the action of a respective deflecting surface member 74 provided at the slide body member 7, which deflecting surface is disposed in its path of movement. It will be readily recognized that the displacement movement of the slider 7 brought about by the cooperation of one of the entrainment pin or bolt members 23 and a slide groove 73 are harmonic, that is to say, these displacement movements occur in accordance with a sinusoidal function of the rotational angle of the rotor.

As best observed by referring to FIGS. 1 and 2, two respective spherical entrainment head members 43 protrude toward the inside from the inner end face or side of each of the planetary pinions 42 revolving with the ring member 4 about the axis $A_5$ in such a manner that their center is located at the dash-dot indicated roll-off bevel outer surface of the associated planetary pinion 42, and furthermore, possess a respective radial spacing $d$ from the central axis of their planetary pinion which is somewhat smaller than the radial spacing $r$ of the entrainment bolt members 23 from the rotor axis $A_2$. As indicated in FIG. 6, these spherical entrainment head members 43 therefore carry out the epicycloidal movements $B_r$ and $B_b$, respectively, relative to two planes $E_r$ and $E_b$ with the corresponding distance $\pm d$ from the plane of revolution $E_o$ of the revolving planetary gear axes. In so doing, in accordance with the given relationships it is assumed that the reference plane $E_r$ is stationary, the reference plane $E_b$ rotates with the angular velocity $\omega_b$ of the moving sun gear rim 32 about the axis $A_5$ and the angular velocity $\omega_o = \omega_p/2$ of the plane $E_o$ is half as large as that of the moving sun gears.

It is known that the axial components of such epicycloidal paths depend sinusoidally upon the rotational movement of the planetary gears about their axes. The entrainment read members 43 thus cooperate in the following manner with the star wheels 6. The star wheels each possess six arm members 60 which are spaced by gaps from one another. At its outer edge each star wheel arm 60 carries a slit-like marginal recess 61, of which the planar middle strips of their flanks, according to FIG. 7, merge via rounded portions with both star wheel planes. Similar type marginal recesses 62 are formed in the spaces between the star arm members 60. They cooperate either with ball or spherical heads 34 or with ball or spherical heads 36. The spherical or ball heads 34 are supported at the plate members 12 via the brackets 35 and thus, just as the sun gear teeth rims 33, are stationary. On the other hand, the spherical or ball heads 36 are supported via pins 37 at the driven gears 3, 3' and therefore travel with the same rotational velocity $\omega_b$ as the sun gear rims 32 revolving about the axis $A_5$.

In FIG. 1, the slide body member 7 is in its left-end terminal position. Consequently, the plane of the star wheel or gear 6' is situated in the plane of the displaced sun gear of the drive or transmission G'. Accordingly, this star wheel 6' is positively and form-lockingly coupled with the driven double gear 3' through the agency of the spherical head 36 engaging in its recess 62. The entrainment heads 43 enter in axial direction, according to the epicycloidal paths $E_b$ of FIG. 6, into the recesses 61 and again retract therefrom, thus do not exert any influence upon the planetary gear 6', the continuous rotational movement of which is transmitted to the output shaft 5 via the hollow shaft 52 and the ball guide arrangement 51.

If, in accordance with FIGS. 1, 3 and 6, an entrainment bolt member 23 of the rotor 22', during the last quarter rotation, is magnetically advanced out of its upper reversing position in the plane $A_2$–$A_5$, then the slide body member 7 during the now successive lower half rotation of the rotor 22' about its axis $A_2$ will be harmonically displaced through the path $2r$. This axial displacement of the slide body member 7 is transmitted to both star wheels 6, 6' and occurs in approximate synchronism with the axial components of the epicycloidal movements of the entrainment head 43. Accordingly, during this phase, the entrainment heads 43 of the planetary pinions 42 of the transmission G' continuously remain in engagement with the marginal recesses 61 of the star wheel 6'. The angular velocity of this star wheel and therefore the output shaft 5, during this axial displacement of the slide body member 7, is thus continuously braked until standstill, and at the end of the displacement movement both star wheels 6 and 6' are positively and form-lockingly coupled via the internal recesses 62 with the stationary ball heads 34. The output shaft 5 is then also blocked.

The entrainment head members 43 of the planetary pinions 42 then, in accordance with the displacement path $B_r$ of FIG. 6, move in axial direction into and out of the slits 61, but no longer exert any influence upon the star wheels 6, 6'.

If sometime thereafter, due to advancing of an entrainment bolt member 23 out of the rotor 22', a further displacement of the slide body member 7 and the hollow shaft member 52 with both of the star wheels 6, 6' is initiated towards the right, then, during this displacement the entrainment heads 43 of the planetary pinions 42 of the planetary gearing G remain engaged. Consequently, the star wheel 6 and therefore the hollow shaft 52 and the output shaft 5 become uniform or steady until the full rotational speed or velocity of the double gear 3, with which there is afterwards coupled the star wheel 6 via its inner recess 62 and the spherical head means 36 supported at the gear 3. The shaft 5 will then rotate in the opposite sense from the direction of rotation for the position of the slider or slide body member according to FIG. 1.

The motion diagram of FIG. 8 illustrates, as a function of time $t$, how the angle of rotation $\alpha_t$ of the output shaft 5 can be continuously changed forwardly or rearwardly from stand-still in acceleration-half steps $b_v$ and $b_r$, each of which extend over one half-step $\Delta\alpha/2$. At each acceleration half-step $b_v$ or $b_r$, there can merge an optional number of uniform whole steps $G_v$ or $G_r$, each of which extend over a complete unit units step $\Delta\alpha$. Each movement sequence, forwardly or rearwardly, is terminated by a deceleration half-step $v_v$ or $v_r$ which extends over one half unit step $\Delta\alpha/2$. During such deceleration half-step, the output shaft member 5 is continuously braked from the full forward- or rearward rotation until standstill. For instance, it is possible for a forward-acceleration half-step $b_v$ and a forward-deceleration half-step $v_v$ to directly follow one another. They complement one another to provide a forward-whole step. Likewise, a forward-deceleration half-step $v_v$ and a rearwardly-acceleration half-step $b_r$ can directly follow one another; but, it is not possible for two deceleration-half steps in the same direction to follow one another without an intermediate acceleration half-step and also the same is true for two acceleration half-steps.

The uniform whole steps G follow one another smoothly, without any jerking, and they also merge without any jerking with a preceding acceleration-half step $b$ and a subsequent deceleration-half step $v$. In each time interval $\Delta_t$ it is possible to pre-select the type of movement in the next time interval $\Delta_t$ by appropriate switching-in or switching-out of one of the magnetic coils 9 in the supply current circuit.

Basically, it would be possible to realize a stepwise drive arrangement according to the describd principles in that the revolving planetary gears 42 only carry a respective entrainment head 43. However, then the shortest possible uniform rotation of the output shaft would extend through twice as large a rotational step as a sequence of an acceleration- and a deceleration step.

The conditions imposed upon the illustrated and described embodiments of stepwise drive, namely, that both of the electro-magnetic coils 9 are never simultaneously energized, can be easily fulfilled by the use of mutually blocking diodes or change-over switches. The previously mentioned deflecting wedges 74 adjacent the slider grooves 73 prevent damage in the event movement of the slider 7 is initiated, but no groove 73 is in its preparatory position to receive an advanced or extended entrainment bolt member 23.

Moreover, it is presupposed that triggering of the signal for the stepwise control is controlled in a programmed fashion while storing the functions of the drive arrangement which are carried out. The entire illustrated stepwise drive arrangement is constructed from conventional components and is not dependent upon the accuracy of power transmission cams or curves. All energy is completely recuperated. A control is only necessary during the non-uniform steps, and also in this case, the expenditure is minimal. It is to be expected that the specific transmitted power of the transmission or drive arrangement can be relatively large.

The basic principle of the illustrated and described stepwise drive arrangement can also be defined in the following manner: It concerns a controllable stepwise drive arrangement for deriving rotational steps or increments and series or sequences of rotational steps of an output shaft from a motor driven input shaft as a function of control signals. The inventive stepwise drive arrangement is manifested by the features that at its common axis $A_5$ there are rotatably mountd in series or behind one another sun gears of planetary gearing G, G', one of which is coupled with the drive shaft 2 and the others possess therefrom stepwise different rotational speeds. Furthermore, with each two sun gears of neighboring rotational speed stages, there engages a respective planetary gear 42 which revolves about the sun gear axis and at one end face carries at least one entrainment member 43 which prforms epicycloidal movements with respect to the plane of the sun gears. This entrainment member cooperates in such a manner with recesses of a power take-off wheel or gear coupled with the output shaft member 5 and coaxially mounted for rotation with respect to the sun gears that this power take-off wheel or gear, under the action of a signal controller harmonic auxiliary drive arrangement 22–7, is displaceable as a function of the input shaft in the direction of the sun gear axis out of discrete positions in which it is coupled with a respective one of the sun gears into a respective neighboring position, whereas during such displacement, it remains coupled with at least one entrainment member 43 of the planetary gear 42 and under such action continuously is accelerated and decelerated, respectively, from the rotational speed of one sun gear to the rotational speed of the next sun gear.

It should be readily apparent that such a drive arrangement or transmission basically can be constructed in such a way that it can serve for stepwise braking until standstill, but with a continuous transition, an output shaft member from a predetermined forward rotational speed and which is coupled with a power take-off wheel or gear, and in the same way can accelerate in steps or stages from standstill, but with a continuous transition, such output shaft to assume a predetermined rearward rotational speed, and vice versa.

It should be apparent from the foregoing detailed description that the objects set forth at the outset of the specification have been successfully achieved.

What is claimed is:

1. A controllable stepwise drive arrangement for deriving unitary rotational steps and an uninterrupted sequence of such unitary rotational steps for an output shaft from a continuously driven input shaft as a function of control signals, comprising at least one planetary gearing means incorporating rotatable sun gear means having a toothed rim, said rotatable sun gear means being operably coupled for continuous rotation with said input shaft, said planetary gearing means further including a stationary sun gear means having a toothed rim, said toothed rim of said driven sun gear means being situated coaxially opposite said toothed rim of said stationary sun gear means, said planetary gearing means including at least one planetary gear revolving about a common axis of both sun gear means, said planetary gear having a toothed rim engaging with said toothed rims of both sun gear means, at least one inwardly protruding entrainment head means carried by said planetary gear at its inner end face and being eccentrically mounted with respect to the axis of rotation of said planetary gear revolving about said common axis of said sun gear means, said entrainment head means carrying out epicycloidal movements relative to both sun gear means, star wheel means having recess means and mounted to be axially displaceable between both sun gear means and substantially coaxial with respect to said gun gear means, said star wheel means being coupled with said output shaft for transmitting rotational movements, said star wheel means being displaceable to-and-fro from a first terminal position in which it is coupled positively and form-lockingly with one sun gear means into a second terminal position in which it is coupled positively and form-lockingly with the other sun gear means, a signal-controlled auxiliary drive arrangement serving for triggering such axial displacements of said star wheel means from the one to the other terminal position and which derives the mentioned axial displacements of said star wheel means as harmonic sinusoidal- or cosinusoidal functions from the continuous rotation of the driven sun gear means in such a manner that during an axial displacement of said star wheel means an entrainment head means of at least one planetary gear continuously remains in engagement with a recess means of said star wheel means and therefore said star wheel means as well as said output shaft coupled therewith is continuously accelerated and decelerated, respectively, by the rotational speed of said one sun gear means.

2. A controllable stepwise drive arrangement as defined in claim 1, further including a common support ring means, a plurality of said planetary gears each of which possesses a support shaft, said support shaft of said plurality of planetary gears being uniformly spaced about the periphery of said common support ring means which revolves about said common axis of said sun gear means, said star wheel means having star arm members, there being twice as many star arm members as there are planetary gears, each of said star arm members being provided with a marginal recess defining said recess means for cooperating with an entrainment head means of a planetary gear, each planetary gear being provided with two diametrically opposed entrainment head means, wherein during axial displacement of said star wheel means one of said entrainment head means remains in engagement with a recess of said star wheel means whereas in each case the other enters between a space situated between two neighboring star arms of said star wheel means when said star wheel means has moved through approximately half of its axial displacement.

3. A controllable stepwise drive arrangement as defined in claim 2, wherein said sun gear means and planetary gears are provided with beveled cone teeth, the centers of said entrainment head means secured to said planetary gears being situated substantially at the roll-off cone surfaces of said planetary gears.

4. A controllable stepwise drive arrangement as defined in claim 2, wherein the transition from the planar central strips of the flank surfaces of said marginal recesses at said star arm members with the outer surfaces of said star wheel means are rounded, and wherein the axial displacement steps of said star wheel means are somewhat greater than the axial components of the epicycloidal paths of said entrainment head means secured to said planetary gears.

5. A controllable stepwise drive arrangement as defined in claim 1, further including a second substantially similar mirror-image symmetrical planetary gearing means disposed in the direction of said common axis of said sun gear means of said first mentioned planetary gearing means, said additional planetary gearing means including stationary sun gear means and a driven sun gear means which is driven by said input shaft with the same rotational speed but opposite to the moveable sun gear means of said first-mentioned planetary gearing means, a star wheel means provided for each planetary gearing means, a common hollow support shaft for both of said planetary gearing means, said star wheel means being secured to the ends of said common hollow support shaft, said signal-controlled auxiliary drive arrangement cooperating with said common hollow support shaft, whereby the latter can be displaced out of each of two possible extreme positions in which the star wheel means of the one or the other planetary gearing means is coupled with its associated moveable sun gear means whereas the star wheel means of the other planetary gearing means is disposed outside of its effective operable region, into a central position in which both star wheel means of both planetary gearing means are coupled with their associated stationary sun gear means.

6. A controllable stepwise drive arrangement as defined in claim 5, further including stationary bearing block means, a further shaft, said further shaft and said input shaft being rotatably mounted in said stationary bearing block means, said input shaft being disposed at one side of an axis which is substantially transversely situated at right angles to and intersecting with said common axis of said output shaft and said further shaft being disposed at the other side of said inter secting transverse axis, each of said transverse extending shafts carrying a pinion meshing with the inner toothed rim of said driven sun gear means constructed as a double-gear arrangement, said signal-controlled auxiliary drive arrangement incorporating a respective rotor means, each of said rotor means being carried by one of said transverse shafts and serving for the axial displacement of said hollow support shaft carrying both of said star wheel means.

7. A controllable stepwise drive arrangement as defined in claim 6 further including a slide body member cooperating with said hollow support shaft, means for mounting said hollow support shaft carrying both said star wheel means so as to be axially displaceable yet non-rotatable with respect to said output shaft, means for mounting said hollow support shaft to be rotatable but axially stationary with respect to said slide body member which is guided for linear displacement along said common axis of said output shaft, said slide body member having flank surfaces which at one side are bounded by the plane of both of said axes and contain three grooves oriented perpendicular to such plane, said two rotor means rotating about said transverse axis in opposite directions each being provided with two axially parallel and eccentrically mounted entrainment bolt members, said signal-controlled auxiliary drive arrangement incorporating a respective signal-controlled displacement mechanism for extending and retracting in the direction of said common axis of said sun gears, said axially parallel and eccentrically mounted pairs of entrainment bolt members for engagement with one of the associated grooves of said slide body member, to thereby provide a linear Maltese drive arrangement which can be switchedin and switched-out and which renders possible the controlled axial to-and-fro displacement of said slide body member and therefore the hollow shaft member with both of its star wheel means.

8. A controllable stepwise drive arrangement as defined in claim 7, further including respective electromagnetic coil means provided for each rotor means, both of said rotor means which are arranged upon said oppositely rotating shafts mounted in the direction of said transverse axis as well as axially displaceable entrainment bolt members mounted at said rotor means being formed of ferromagnetic material and closing a ferromagnetic flux circuit of said respective electromagnetic coil means, each respective electromagnetic coil means possessing a core member embodying a first pole shoe partially surrounding the associated rotor means and a second pole shoe having a substantially cylindrical guide surface arranged in front of said entrainment bolt members and above the plane defined by both said axes in such a manner that said entrainment bolt members remain adhering to said guide surface and can be extended out of the associated rotor means for engagement with one of said grooves of said slide body member which is in a preparatory position when said electromagnetic coil means carries current during an appropriate rotational phase and that the relevant entrainment bolt members after carrying out displacement of said slide body member are again pushed back into their associated rotor means by the same cylindrical guide surface.

9. A controllable stepwise drive arrangement as defined in claim 5, further including coupling body means operably secured to said driven and stationary sun gear means of the associated planetary gearing means, each of said star wheel means having a plurality of star arm members and being provided with a respective recess between said star arm members which cooperate with said coupling body members.

10. A controllable stepwise drive arrangement for deriving rotational steps and rotational step sequences for an output shaft from a motor driven input shaft as a function of control signals, comprising planetary gearing means incorporating rotatably mounted sun gear means arranged behind one another at a common aixs, one of said sun gear means being coupled with said driven input shaft and the others possessing stepwise therefrom different rotational speeds, a respective planetary gear revolving about the axis of said sun gear means meshing with two sun gear means of neighboring rotational speed stages, said planetary gear carrying at one end face at least one entrainment means carrying out epicycloidal movements with respect to the planes of said sun gear means, a power take-off wheel having recesses and mounted coaxially for rotation with respect to said sun gear means and coupled with said output shaft, said entrainment means cooperating with said recesses of said power take-off wheel, a signal-controlled harmonic auxiliary drive arrangement cooperating with said power take-off wheel, said power take-off wheel being displaceable as a function of the input shaft in the direction of the axis of said sun gear means from discrete positions in which it is coupled with a respective sun gear means into a neighboring position, whereas during such displacements it remains coupled with at least one respective entrainment means of a planetary gear and under the action thereof is continuously accelerated and decelerated, respectively, from the rotational speed of one sun gear means to the rotational speed of the next sun gear means.

References Cited
UNITED STATES PATENTS

| | | | |
|---|---|---|---|
| 3,267,837 | 8/1966 | Yo Sato et al. | 74—394X |
| 3,424,102 | 1/1969 | Nectoux | 74—394X |

LEONARD H. GERIN, Primary Examiner